United States Patent Office 3,093,014
Patented June 11, 1963

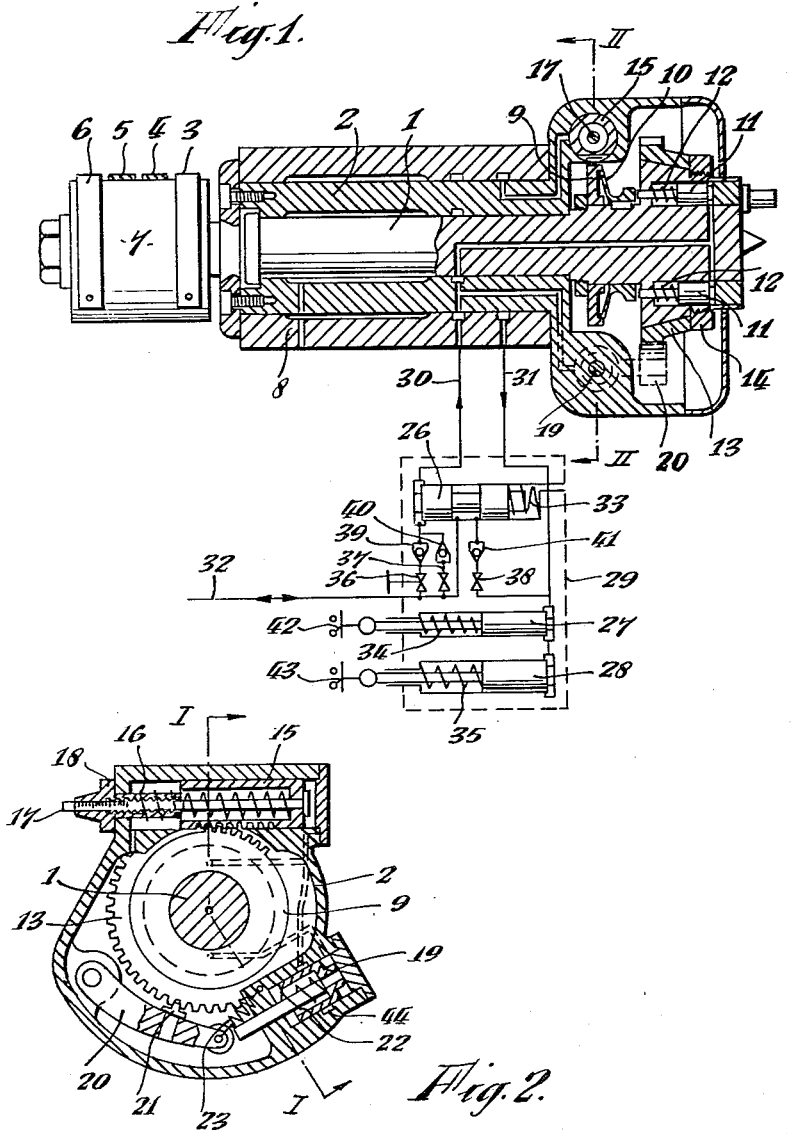

3,093,014
INDEXING DEVICE
Willi Graf, Zurich, Switzerland, assignor to Maag Gear Wheel & Machine Company Limited, Zurich, Switzerland
Filed Dec. 7, 1959, Ser. No. 857,645
Claims priority, application Switzerland Dec. 12, 1958
3 Claims. (Cl. 74—822)

This invention relates to indexing devices for gear-machining machines, having an indexing plate or ring connected rigidly but interchangeably to an indexing spindle, the object being to provide improvements therein.

An indexing device is known wherein the indexing plate or ring is provided with sawtooth-shaped ratchet teeth, which plate or ring, by means of an oil stream acting always in the same direction, is pressed with uniform pressure for the radial face of one tooth thereof to be engaged by a disengageable stop pawl, so that the indexing ring or plate is arrested free from play, the oil pressure to the indexing ring or plate being controlled by a device, the said control device operating to reverse the directions of flow of oil streams in two branch lines for a short instant of time whereby two pistons are actuated, one of the said pistons so actuated withdrawing the pawl from engagement with the ratchet tooth and immediately thereafter releasing the pawl to re-engage the ratchet, while the other piston, operating a rack, after releasing the pressure on the indexing ring or plate by the transient reverse movement of the oil stream, rotates the indexing ring or plate further by the oil stream acting immediately in the initial direction again, until the radial or stop-face of the next ratchet tooth on the ring or plate abuts against the stop pawl, the latter in the meantime having slid down the sloping rear face of the previously engaged tooth, and the indexing ring or plate again is arrested in this position, free from play, by the uniformly high oil pressure.

An indexing device according to this invention, having an indexing ring connected rigidly but interchangeably to an indexing spindle, is characterised in that the indexing ring is adapted to be rotated by a piston having an adjustable stroke, the said stroke being adjustable externally of the device in accordance with the desired angle of rotation of the indexing ring, and a second piston, operated as a function of the position of the said adjustable piston, is adapted to co-operate with means for locking the indexing spindle against rotation and for releasing said spindle to allow rotation thereof.

This device has the advantage of great simplicity, operating reliability and accuracy, since relatively few parts participate in the movements.

One embodiment of the invention is shown diagrammatically in the accompanying drawings, wherein:

FIG. 1 is a longitudinal section taken on line I—I of FIG. 2; and
FIG. 2 is a cross section taken on line II—II of FIG. 1.

A workpiece, not shown, is connected to an indexing spindle 1 so that there is no relative rotation, the workpiece being, for example, a gear which is to be ground by the generating method. A generating head 2, in which the indexing spindle 1 is mounted, receives the generating motion in known manner from rolling bands 3, 4, 5 and 6, which roll without slip on a generating cylinder 7 in known manner. The generating cylinder 7 is rigidly connected to the generating head 2 which in its turn is mounted in a bearing housing 8. A gear 9 is rotatably mounted on the indexing spindle 1. A clutch disc 10 is mounted on the indexing spindle 1 so as to be axially slidable but not rotatable thereon, the clutch disc 10 engaging the gear 9 and being axially thrust thereonto, the axial thrust movement being effected by pistons 11 mounted in the indexing spindle 1. Springs 12 urge the pistons away from the clutch disc 10. An indexing ring 13, provided with a peripheral gear, is rigidly mounted on the indexing spindle 1, the ring being forced on to a cone on the indexing spindle by means of a nut 14; when a workpiece having a different gear pitch is to be worked upon a new indexing ring 13 corresponding to the new pitch of the workpiece is mounted on the indexing spindle.

In the generating head 2, a piston 15 provided with a toothed rack is mounted slidable transversely to the indexing spindle 1, the rack on the piston meshing with the gear 9. A compression spring 16 urges the piston 15 to the right (FIG. 2). Rigidly connected to the piston 15 is a screwthreaded rod 17, the latter projecting from the generating head 2 and being provided with a scale. The set nut 18 limits as stop the movement of piston 15 to one side, so that this piston may be termed adjustable. Also mounted in the generating head 2 is another piston 19 which moves axially to abut and rock an indexing lever 20. This indexing lever 20 is mounted pivotally in the generating head 2 and has an indexing pin 21 which engages the indexing ring 13 to fix the latter in a position, or is lifted off the ring by the piston 19 to release the ring. A compression spring 22 urges the piston 19 to the right (FIG. 2), that is, away from the lever 20, while a tension spring 23 pulls the indexing lever 20, and hence also the indexing pin 21, into the indexing plate 13.

For controlling the indexing process, control pistons 26, 27 and 28 with compression springs 33, 34 and 35 are accommodated in a control block 29. The control block 29 is connected, on the one hand, by two pipelines 30 and 31 to the bearing housing 8, and, on the other hand, by a pipeline 32 to an indexing and feed valve, not shown, which, as required, supplies pressure oil to the block or allows oil to return therefrom. A gear pump, which pumps the pressure oil, also is not shown, since this may be assumed to be known. In the control block 29 are also throttling points 36, 37 and 38, the throttling point 36 being adjustable from the exterior of the block 29. In addition, associated with the three throttling points 36, 37 and 38, three one-way valves 39, 40 and 41, respectively, are provided. The two control pistons 27 and 28 each act, respectively, against the action of the respective springs 34, 35, on electrical contacts 42 and 43.

The automatic indexing device operates as follows:

The indexing movement is initiated by the indexing valve, not shown, that is, the pipeline 32 is supplied with pressure oil. The oil passes through the throttling point 37, which determines the indexing speed, into the pressure space of the control piston 26, whereupon the latter is moved to the right (FIG. 1) against the action of the spring 33. Then the pressure oil flows to the two pistons 11, through the pipeline 30 and ducts in the generating head 2 and the indexing spindle 1, and the pistons 11 are moved to the left (FIG. 1) against the action of the springs 12. The clutch disc 10 is thereby pressed into the gear 9 and these two elements are forcibly connected together so that the gear 9 is secured against rotation on the indexing spindle 1. On further increase of the oil pressure in the system the piston 19 is displaced, against the action of the spring 22, to engage the indexing lever 20 and lift the indexing pin 21 out of a tooth gap of the indexing plate 13. In this position of the piston 19, pressure oil can now flow into an annular groove 44 and thence into the pressure space of the rack piston 15 thereby moving the latter to the left (FIG. 2) against the action of the spring 16. The movement of the rack piston 15 to the left (FIG. 2) is limited by the abutment of the end of the piston with the end of the piston chamber, and the movement to the right is limited by the nut 18 which is adjusted on the screw-threaded rod to register with an appropriate marking on the scale on said rod; the distance of movement of the piston 15, between the said limits, corresponds to the desired angle of rotation of the indexing spindle 1, and is pre-selected and pre-adjusted according to the number of teeth of the workpiece. By way of the rack on the adjustable piston 15, the movement of the piston is transmitted to the gear 9 and to the indexing spindle 1, since the said gear is forcibly connected to the indexing spindle 1. At this moment after indexing has been effected, the maximum oil pressure provided in the system has been reached. Simultaneously with the operation of indexing, pressure of oil in the pipeline 31 causes the control piston 28 to be moved to the left, the spring 35 being adjusted to this pressure condition in the oil system. Thereby the electrical contact 43 is closed so as to be able, subsequently, to transmit the command "End of indexing."

The pressure space for the rack piston 15 is also connected through the pipeline 31 to the pressure space of the control piston 27, and in the case of maximum oil pressure the control piston 27 now moves to the left (FIG. 1), overcoming the corresponding pressure of the spring 34 and operating the electrical contact 42, which transmits the command "End of indexing" electrically by way of contact 43 and a magnet to the feed valve, not shown. This sets in operation the feed of the machine for resuming operation on the tooth flanks, which has been interrupted during indexing. As a further consequence of the movement of the feed valve, the pipeline 32 to the control block 29 of the indexing apparatus becomes pressureless, that is, it is connected to discharge, whereupon the piston 27 is pushed to the right (FIG. 1) by the spring 34 and hence also the contact 42 is opened, then the piston 19 is returned to the starting position by the spring 22, and the indexing lever 20 is released and by means of the tensioning spring 23 is caused to engage the indexing pin 21 in a tooth gap of the indexing plate 13 and to arrest the indexing ring 13. The throttling point 37 prevents excessively rapid drop of the indexing pin 21 and pressure loss on the pistons 11, whereby only now do the control piston 26 and the pistons 11 return to their starting positions, the clutch disc 10 also releasing the forcible connection between the gear 9 and the indexing spindle 1. Due to the present position of the control piston 26, a certain reduced pressure is still maintained in the pipeline 31 by way of the throttling point 38, and the rack piston 15 is moved into the starting position under the action of the spring 16. Thereby, during this time, the electrical contact 43 still remains closed by means of the control piston 28 until the rack piston 15 has reached its starting position. On the further collapse of the pressure in the pipeline 31, the lighter spring 35 moves the control piston 28 to open the contact 43, whereupon the feed valve returns to the starting position and all the elements are ready for renewed indexing.

In brief, the function of the indexing apparatus is first to couple the indexing spindle 1 to the rack piston 15, and thereupon the indexing pin 21 is lifted out of engagement with the ring 13. The pre-determined indexing movement is then effected, followed by exact positioning and fixing again by means of the indexing pin 21 engaging a tooth of the ring 13, whereupon the clutch 9, 10 is uncoupled and all elements return to the starting position.

By means of the arrangement described, the indexing time per revolution of the workpiece remains approximately constant, independently of the number of teeth on the workpiece, since the sum of the movements of the rack piston 15 per revolution of the workpiece is constant. Furthermore, the generating head 2 with the control block 29 forms a self-contained unit in regard to the indexing mechanism, which unit participates in the generating movement and is connected to the rest of the machine only by the pipeline 32 which may be flexible.

What I claim and desire to secure by Letters Patent is:

1. An indexing device for gear cutting machines and the like comprising an indexing spindle, an interchangeable indexing ring mounted fixedly upon said indexing spindle, a first hydraulic piston having an adjustable stroke, a gear rotatably mounted on said indexing spindle engaging said first piston, a hydraulically operated clutch disc upon said spindle moved axially against said gear to couple said spindle and gear and held there during the indexing stroke coupling said indexing ring to said gear, means for adjusting said stroke of said piston to provide a predetermined angle of rotation of said indexing ring, means for locking said indexing ring against rotation and a second hydraulic piston controlling said locking means independently of the position of said first piston.

2. An indexing device as set forth in claim 1 wherein hydraulic pistons are provided for coupling said disc to said gear.

3. An indexing device as set forth in claim 1 wherein hydraulic control means are provided controlling the indexing operation cooperating with said pistons and said disc.

References Cited in the file of this patent
UNITED STATES PATENTS

| | | |
|---|---|---|
| 626,666 | Chappel | June 13, 1899 |
| 921,071 | Borg | May 11, 1909 |
| 1,745,460 | Sudhoff | Feb. 4, 1930 |
| 1,942,927 | Johnson | Jan. 9, 1934 |
| 2,174,569 | Dinzl | Oct. 3, 1939 |
| 2,633,035 | Livermore | Mar. 31, 1953 |
| 2,633,777 | Hoern | Apr. 7, 1953 |
| 2,642,972 | Brooks | June 23, 1953 |
| 2,646,150 | Hobbs | July 21, 1953 |
| 2,672,773 | Schofield | Mar. 23, 1954 |
| 2,832,235 | Denman | Apr. 29, 1958 |
| 2,871,732 | Olson | Feb. 3, 1959 |
| 2,877,670 | Allen | Mar. 17, 1959 |
| 2,902,889 | Trechsel | Sept. 8, 1959 |
| 2,905,029 | Gustafson | Sept. 22, 1959 |
| 2,963,115 | Peras | Dec. 6, 1960 |
| 2,966,813 | Squiller | Jan. 3, 1961 |